(12) United States Patent
Engel et al.

(10) Patent No.: US 9,542,384 B2
(45) Date of Patent: Jan. 10, 2017

(54) CONTEXTUALLY AWARE WEB APPLICATION PLATFORM

(75) Inventors: Maxwell R. Engel, Santa Monica, CA (US); Wade Chambers, Fremont, CA (US); Justin Cody Simms, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1035 days.

(21) Appl. No.: 12/200,783

(22) Filed: Aug. 28, 2008

(65) Prior Publication Data

US 2010/0058177 A1 Mar. 4, 2010

(51) Int. Cl.
| | | |
|---|---|---|
| G06F 17/00 | (2006.01) | |
| G06F 17/27 | (2006.01) | |
| G06Q 30/02 | (2012.01) | |
| G06F 17/24 | (2006.01) | |
| G06F 17/30 | (2006.01) | |
| G06F 17/21 | (2006.01) | |
| G06F 17/22 | (2006.01) | |

(52) U.S. Cl.
CPC ....... *G06F 17/277* (2013.01); *G06F 17/30893* (2013.01); *G06F 17/211* (2013.01); *G06F 17/2247* (2013.01); *G06F 17/24* (2013.01); *G06F 17/3089* (2013.01); *G06F 17/30899* (2013.01); *G06F 17/30905* (2013.01); *G06Q 30/02* (2013.01)

(58) Field of Classification Search
CPC .............. G06F 17/277; G06F 17/30893; G06F 17/2247; G06F 17/24; G06F 17/211; G06F 17/3089; G06F 17/30905; G06F 17/30864; G06Q 30/02

USPC ....... 715/800, 252, 230–237, 246, 708, 767, 715/802, 203, 273, 774
See application file for complete search history.

(56) References Cited

U.S. PATENT DOCUMENTS

| | | | |
|---|---|---|---|
| 8,595,186 B1 * | 11/2013 | Mandyam | G06F 8/38 707/632 |
| 2005/0097008 A1 * | 5/2005 | Ehring | G06F 17/211 715/205 |
| 2007/0113188 A1 * | 5/2007 | Bales et al. | 715/742 |
| 2007/0136320 A1 * | 6/2007 | Sah et al. | 707/100 |
| 2008/0046562 A1 * | 2/2008 | Butler | 709/224 |
| 2008/0133722 A1 * | 6/2008 | Ramasundaram et al. | 709/222 |
| 2008/0270929 A1 * | 10/2008 | Bohn et al. | 715/772 |
| 2009/0006454 A1 * | 1/2009 | Zarzar et al. | 707/102 |
| 2009/0077094 A1 * | 3/2009 | Bodain | 707/10 |
| 2009/0217352 A1 * | 8/2009 | Shen et al. | 726/3 |
| 2014/0207580 A1 * | 7/2014 | Minnis et al. | 705/14.66 |

OTHER PUBLICATIONS

Srinivas et al. "Coupling RDF/RSS, WSRP and AJAX for Dynamic Reusable Porlets: AN Approach and a Use Case" Published Jul. 2009-Jul. 2013, 1007 by CS Digital Library, pp. 3.*
Google Code, Google Gears API, http://code.google.com/apis/gears/, Dec. 3, 2007, 24 pgs.

(Continued)

*Primary Examiner* — Quoc A Tran
(74) *Attorney, Agent, or Firm* — Berkeley Law & Technology Group, LLP

(57) ABSTRACT

In an example embodiment, the appearance and/or operation of a web application may be modified based, at least in part, on one or more contextual elements of a web page.

27 Claims, 7 Drawing Sheets

(56) References Cited

OTHER PUBLICATIONS

Adobe Developer Connection, Central 1.5: Desktop Dynamo, http://www.adobe.com/devnet/central/articles/whatsnew_15.html, 8 pgs.
Google Code, Google Gears API, http://code.google.com/apis/gears/, Dec. 3, 2007, 24 pages.
Adobe Developer Connection, Central 1.5: Desktop Dynamo, http://www.adobe.com/devnet/central/articles/whatsnew_15.html, Dec. 3, 2007, 8 pages.

* cited by examiner

CONTEXTUALLY AWARE WEB APPLICATION PLATFORM

This patent application is being concurrently filed with U.S. patent application Ser. No. 12/200,630, titled "Embeddable Web Application Agent," filed on Aug. 28, 2008, by Engel; and U.S. patent application Ser. No. 12/200,545, titled "Multiple Views for Web Applications Across Multiple Endpoints," filed on Aug. 28, 2008, by Gibb et al.; both of which are assigned to the assignee of currently claimed subject matter and incorporated by reference in their entirety.

FIELD

Subject matter disclosed herein may relate to a web application execution platform to alter the appearance and/or operation of an application based, at least in part, on a context of a web page.

BACKGROUND

With networks such as the Internet gaining tremendous popularity, and with the vast multitude of pages and/or other documents and/or other media content becoming available to users via the World Wide Web (web), it has become desirable for some web page publishers and/or other entities related to the web to implement application execution environments to allow users to run applications via the entity's web site, and to entice users to visit the sites. Such application execution environments may comprise "stand alone" environments, with the web page publisher performing page assembly as well as performing back-end integration with data storage, social information, etc.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
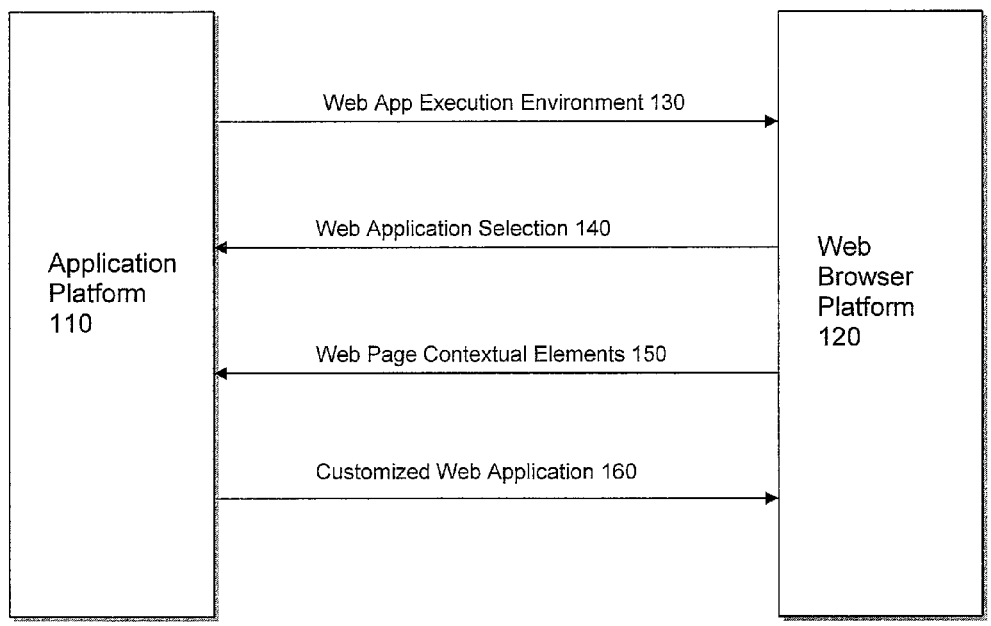
FIG. 1 is an illustration depicting an example application platform and a web browser platform.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, it may be desirable for web page publishers and/or other entities related to the web to implement application execution environments to allow users to run applications via the entity's web site, and to entice users to visit particular web sites. Web application developers may produce applications to operate within the web application execution environments. Applications may be developed for a particular web page, or a particular type of web page. If the application developer desires to have the web application accessible via other web pages and/or web sites, and/or if the developer desires to customize an application for different web pages, different versions of the application may be generated and provided to the application execution environments. Thus, web application developers may incur additional effort and/or expense in porting applications across multiple web sites and/or pages.

In an example embodiment, a web application platform may receive one or more code segments associated with a web application from a web application developer, for example, and may generate multiple views of the application to be displayed across multiple web sites and/or web pages. The web developer, for an example embodiment, may avoid generating customized code for the various web sites and/or pages, thus reducing the effort and/or expense of developing the application. Further, the application platform may provide users with different views of the application to suit various circumstances, for another example.

For one or more embodiments described herein, web applications may be accessed from and/or displayed in a designated application area within a web page. Such an application area may be referred to as a "dropzone", although the scope of claimed subject matter is not limited in this respect. Dropzones are discussed more fully below.

Also, for one or more embodiments, the appearance and/or operation of a web application may be modified based, at least in part, on one or more contextual elements of a web page. For example, if the web application is a stock quote application, the application may display a stock quote for the XYZ corporation if the application is being accessed from the XYZ web site or a web site associated with the XYZ corporation, and the same web application, without specific customization from the web application developer, may display a stock quote from the ZYX corporation if the web application is accessed from a web site associated with the ZYX corporation. In this manner, a web application developer may generate a single web application that may be automatically customized in some manner according to the context of the web page from which the application is launched and/or displayed.

Continuing with the stock quote web application example, consider a web site that may include separate web pages for each of a number of publicly traded companies for which a user may wish to obtain a stock quote. In an embodiment, a web application developer may generate a single stock quote web application that may be launched and/or displayed from any of the aforementioned web pages for the various publicly traded companies. That single stock quote web application may be automatically customized according to the context of each of the web pages such that appropriate stock quotes are provided for each company depending on the web page from which the application is launched. Further, the color scheme and company name and/or logo displayed may change according to the context of whichever page from which the web application is launched, to name just a couple examples of how a web application may be modified in accordance with claimed subject matter. The same application launched and/or displayed at one web site may vary in appearance and/or operation from that same application launched and/or displayed at another web site. In an example embodiment, the grouping of web pages related to financial information for the publicly traded companies may represent one example of an "endpoint." Individual web pages may also be referred to as endpoints, as described below.

For another example of how a web application may be automatically customized according to contextual elements of a web page, consider a web application that provides movie start times. A web site for this example may include separate web pages for individual movies currently playing in theatres, for example. The grouping of web pages related to these movies may comprise an endpoint, for example. For each of the web pages of this example "movies" endpoint, a web application area may be provided from which one or more web applications may be launched. For the current example, a movie start time application may be provided. If a user is visiting a web page for a first movie desires to know available start times for that movie for theaters within a specified region, the user may launch the movie start time web application. Alternatively, the web application may be launched automatically upon the user accessing the web site. A number of start times for a number of theaters in a region specified by the user or otherwise determined may be displayed to the user. Similarly, if the user visits the web page for a second movie, movie start times for the second movie may be displayed. In each case, the identical web application may be utilized, but the appearance and/or operation of the web application may be automatically customized depending on contextual elements of the web pages. In the case of the movie start time application, the web application may perform a syntactic analysis of the information contained on the web page associated with a particular movie to determine the title of the movie, and the web application may in turn retrieve the proper start times for that movie. For another example, "hooks" or "tags" may be provided by the web application that may allow the web page publisher to provide values for one or more variables related to the content and/or context of one or more web pages. A web application platform may utilize the provided values to determine in which manner(s) to modify the appearance and/or operation of the web application.

FIG. 1 is an illustration depicted example interactions between an application platform 110 and a web browser platform 120. For one or more embodiments, application platform 110 may comprise a server computing platform that may serve both as a web page publisher and as a web application execution platform, although the scope of claimed subject matter is not limited in this respect. An application platform, such as platform 110, may provide web application services to user computing platforms, in one or more embodiments. Example application platforms are described more fully below.

For the example of FIG. 1, application platform 110 may provide a code segment comprising a web application execution environment 130 to a web browser platform 120. In an example embodiment, web application execution environment 130 may be embedded in a web page that is also transmitted to web browser platform 120. Web application execution environment 130 may comprise a dropzone, in one or more embodiments, although the scope of claimed subject matter is not limited in this respect.

At least in part in response to receiving the web application execution environment 130, web browser platform 120 may display a web page and may execute the code segment transmitted by the application platform. In an embodiment, and as described more fully below, the code segment for the web application execution environment, or dropzone, may provide a user with a gallery of web applications from which to choose. If the user selects a web application, a web application selection value 140 may be transmitted by web browser platform 120 to application platform 110, for an example embodiment.

Also for an embodiment, web browser platform 120 may provide one or more web page contextual elements 150 to application platform 110. The contextual elements may comprise any of a wide range of information about the web page within which the web application execution environment may be displayed. At least in part in response to receiving web page contextual elements 150, application platform 110 may modify and/or customize the selected web application 160, and the customized web application may be transmitted to web browser platform 120. Web browser platform 120 may execute customized web application 160 within the web application execution environment 130 in the web page. For an example embodiment, web browser platform 120 may comprise a user computing platform upon which a browser application may be executed and web pages displayed. Web browser platform 120 may comprise a processor (not shown) to execute a plurality of instructions stored on a storage medium to enable the web browser platform to browse web pages and/or execute and/or display web applications.

For one or more embodiments, web page contextual elements 150 may be determined by web browser platform 120 executing web application execution environment 130 to perform a syntactic analysis of the web page. For one or more embodiments, the syntactic analysis may comprise a syntactic analysis of a universal resource identifier, such as a uniform resource locator (URL) associated with the web page. Also in one or more embodiments, web page contextual elements may be provided by a web page developer in the way of "hooks" and/or "tags" that may comprise variable values embedded in the web page, perhaps as metadata, and made available to application platform 110. In this manner, no syntactic analysis need be performed, although such an analysis may be performed in one or more embodiments.

As depicted in FIG. 1, application platform 110 may further comprise a web page publisher to provide one or more web pages to web browser platform 120. However, for one or more other embodiments, the web page publisher may comprise a third-party publisher. One such embodiment is described in more detail below.

In a further aspect, for one or more embodiments, applications may use the web page contextual elements described above in conjunction with contextual information related to one or more users to customize the operation and/or appearance of the application. For example, contextual information gathered from a user's friends list may be used in conjunction with contextual information from a web page to modify an application. One example application may comprise a fantasy sports application that may also provide scores from games and/or other sports-related information. If a user is viewing a page related to a first sports team, the application may display scores and/or other information related to that team, and may also, for one example embodiment, display a listing of any individuals from the user's friends list that have players from the first team on their fantasy teams. If the user visits a page from a second sports team, the application may display scores and/or other information related to the second team, and may also display a listing of any of the user's friends that have players from the second sports team on their fantasy teams. Thus, for one or more embodiments, the appearance and/or operation of an application may be based not only on contextual information gathered from a web site, but may also be based on other information, such as, for one example embodiment, information related to a user's friends list. The information related to the user's friends list may include information related to the profiles for the individuals on the list, and may further include information related to the individual friend's activities with respect to one or more applications.

Figure 2:
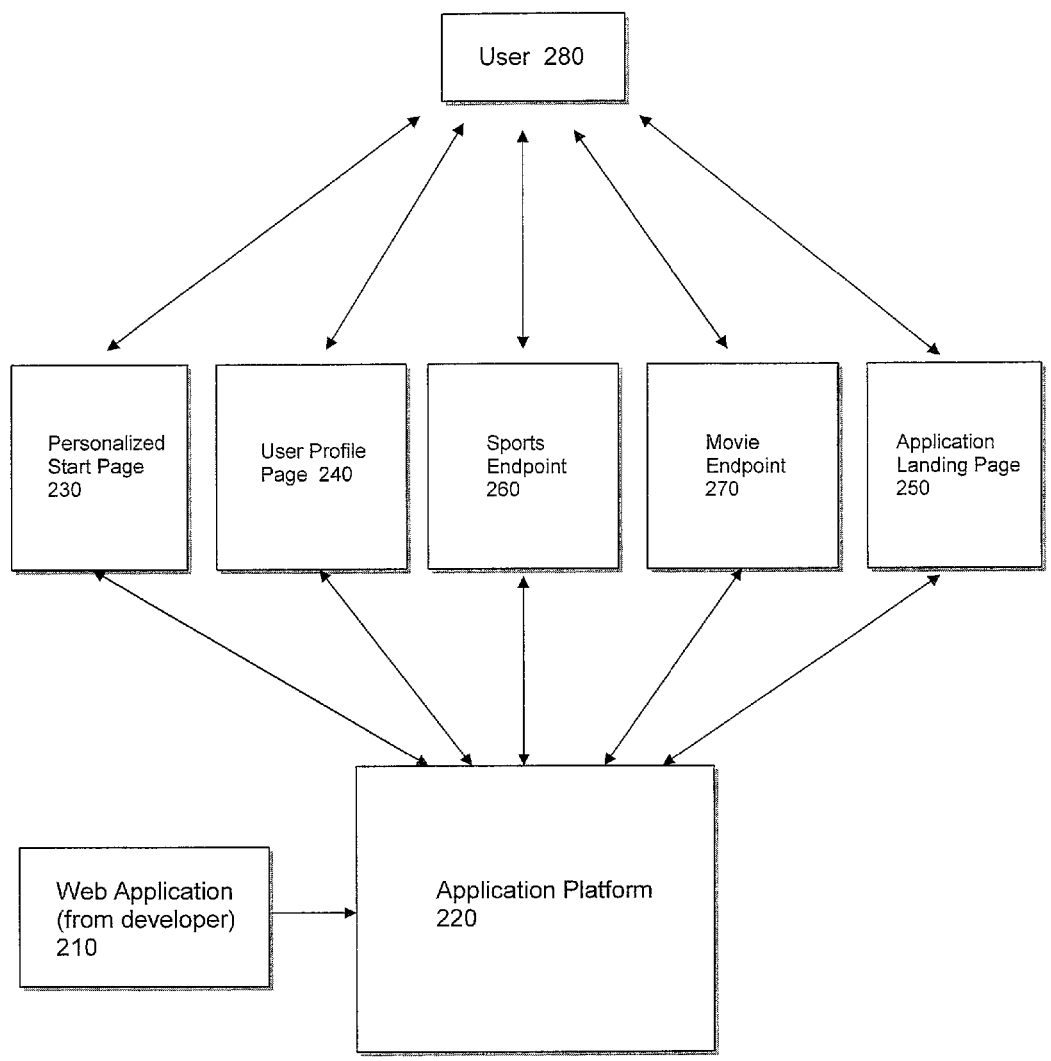
FIG. 2 is a block diagram of an example system comprising a web application platform.

FIG. 2 is an illustration depicting an example embodiment of an application platform 220. A web application developer may, for an example, develop a web application 210, and may desire to allow a user 280 to access the developed application 210 from any of a number of different web sites and/or pages. For the example embodiment of FIG. 2, such web pages and/or sites may include a personalized start page 230, a user profile page 240, and/or an application landing page 250, and may also comprise one or more endpoints such as, for example, a movie endpoint 270 and a sports endpoint 260. Movie endpoint 270 for this example may comprise a plurality of web pages devoted to a plurality of movies. For the present example, each movie may have one or more web pages devoted to it, although the scope of claimed subject matter is not limited in this respect. Similarly, sports endpoint 260 may comprise a plurality of web pages devoted to a plurality of sports teams, and each team may have one or more web pages devoted to it.

Although for the example depicted in FIG. 2 personalized start page 230, user profile page 240, application landing page 250, sports endpoint 260, and movie endpoint 270 comprise entities separate from application platform 220, other embodiments are possible with one or more of the web pages and/or endpoints as part of the same entity as application platform 220, and the scope of claimed subject matter is not limited in this respect.

Application landing page 250 for embodiments described herein may comprise a web page dedicated to one or more web applications, such as application 210. User profile page 240 may be utilized to store information related to user 280, for this example embodiment. Information such as names, identifiers, email addresses, biographical information, interests, hobbies, etc., to name but a few types of information that may be maintained in a personal profile page. For one or more embodiments, user profile page 240 may also include one or more friends lists containing names or identifiers of individuals and/or groups of individuals associated with user 260. Further, for an embodiment, profile page 240 may support web applications such as application 210, and one or more views of application 210 may be supported. Also for one or more embodiments, public, shared, and/or private information supplied by user 280 to user profile page 240 may be accessed by web application 210, thereby providing the web application with a source of user information and/or social connections. User 280 may be provided an option, for an example embodiment, to not share private information, and/or to not share particular pieces of private information.

As depicted in FIG. 2, and as described above, web application 210 for this example embodiment may be accessed by user 280 in any of several ways. For example, web application 210 may be accessed via a number of endpoints. Endpoints for this example may include application landing page 250, user profile page 240, and/or personalized start page 230, as well as endpoints 260 and 270, previously described. For an embodiment, a web developer may be provided with one or more application programming interfaces (API), discussed more fully below, that may permit the developer to specify a web application that can be automatically made available to user 280 without requiring the web developer to produce different code for the different endpoints. Rather, application platform 220 may receive code from the web developer for application 210 and may provide support for application 210 for each of the different endpoints. Multiple views of web application 210 may also be supported at the different endpoints.

As used herein, the term "endpoint" is meant to include any network location through which a user may access information. A network may include, for example, the Internet, and network locations may include, but are not limited to, web sites and/or web pages. In an embodiment, an endpoint may comprise a web site, and in other embodiments an endpoint may comprise at least a portion of a web site. For example, a web site may include one or more pages associated with a sports theme, and may also include one or more pages associated with a movies theme. The one or more sports pages may comprise one or more endpoints, and the one or more movie pages may comprise one or more additional endpoints. For another example, an endpoint may comprise a profile page for a user, and/or may comprise a personalized start page for the user. Of course, these are merely example endpoints, and the scope of claimed subject matter is not limited in this respect.

In an embodiment, user 280 may install an application such as web application 210 using a number of techniques. For an example, if user 280 is visiting one of the endpoints supported by application platform 210, user 280 may make a selection from a pull-down menu, a hypertext link, and/or other form of a "call to action" that may cause an area to be opened on the displayed page. Such an area may be referred to as a "dropzone", as discussed more fully below, although the scope of claimed subject matter is not limited in this respect. A dropzone may comprise, for an example, an area of a web page in which web applications may be displayed.

For an example embodiment, if user 280 makes a selection that causes the dropzone to appear, an "application gallery" may also be displayed. The application gallery for an example embodiment may be displayed approximately adjacent to the dropzone, and/or may be displayed within the dropzone, although the scope of claimed subject matter is not limited in this respect. The application gallery, for an embodiment, may provide user 280 with a number of web applications from which the user may choose. The application gallery may comprise information related to the various available web applications, including such information, for example, as application names, descriptions of the applications, one or more categories for the applications, the number of other installations of the various applications, profile information for web application developers, icons for the applications, and/or screenshots of one or more of the applications. Further types of information that may be provided to user 280 may include, but are not limited to, statistics regarding popularity of one or more applications, perhaps both among the user's friends and the larger public, ranking information for one or more applications, perhaps provided by third-party testers, for example, reviews of one or more applications by journalists and/or users, and/or the developer's terms of service. At least portions of such information may be provided to application platform 220 by the web application developer, and such information may be offered in the form of metadata associated with the developed web application. Of course, these are merely examples of the types of information that may be included in an application gallery, and the scope of claimed subject matter is not limited in this respect.

For an embodiment, through the application gallery, a user may browse applications by application name, category, ratings/rankings, developer name, tags, and/or other information provided by the application gallery. Further, a user may, for some embodiments, browse friend's applications, as well as applications the user may have installed and/or otherwise accessed at other endpoints. A user may select an application for an example embodiment by "clicking" on an icon associated with the application using a mouse and/or other pointing device, although the scope of claimed subject matter is not limited in this respect.

For an embodiment, upon receiving the selection from the user, the selected application, such as web application 210 for the current example, may be opened in the dropzone. For one or more embodiments, user 280 may test or "demo" the application for a period of time before permission may be granted for the application platform to access user personal and/or social data. At the conclusion of the test period, or whenever user 280 may instruct, the gallery may be closed, and the selected web application may be added to the user's profile. As such, the application may be made available to the user from any of the endpoints associated with application platform 220.

Also for an embodiment, upon receiving the selection from the user, one or more contextual elements related to the web page displaying the dropzone may be provided to application platform 220. Application platform 220 may customize the web application in appearance and/or in operation in some fashion based, at least in part, on the contextual elements. As described previously, the contextual element values may be determined, for one or more embodiments, through a syntactical analysis of the web page to detect appropriate information. For example, if user 280 is visiting one of the web pages associated with sports endpoint 260, the web application may be customized in order to reflect the team colors and/or logo of the sports team associated with that particular web page. In this manner, the web application may have a customized appearance and/or operation for each web page, for example.

In an embodiment, the selected application may be stored in an application bin on the user's profile page. The application bin may show, for example, an application's name and/or icon. For one or more embodiments, if the user clicks on the name and/or icon, the application may be opened in a full view, described below, on the application's landing page, although the scope of claimed subject matter is not limited in these respects.

For one or more embodiments, endpoints may be maintained by the same entity as application platform 220, although in one or more other embodiments, one or more endpoints may be maintained by third-party web page publishers, as is discussed more fully below. For third-party web page publishers, a gallery API may be provided to enable the third-party developer to generate an application gallery, thereby enabling the third-party publisher to import applications supported by application platform 220 and further enabling user 280 to browse and select web applications associated with application platform 220 from an endpoint not directly maintained by the application platform.

As used herein, the term "install" as it refers to a web application is meant to denote associating the web application with a particular user. For example, if a web application is installed, it may be stored in a list of applications as part of the user's profile, and the web application may be made available to the user by way of a menu or some other technique at one or more endpoints associated with the user.

In the example techniques described above, note that a single installation may result in the web application being installed at multiple endpoints, thus enhancing the user's web experience and perhaps enhancing the user's attraction to endpoints associated with application platform 220, thereby encouraging the user to visit the endpoints more frequently. Also, the customized web applications based on web page context may further enhance the user's experience, and may also encourage the user to visit the web sites more frequently and/or to access the web applications more frequently.

Figure 3:
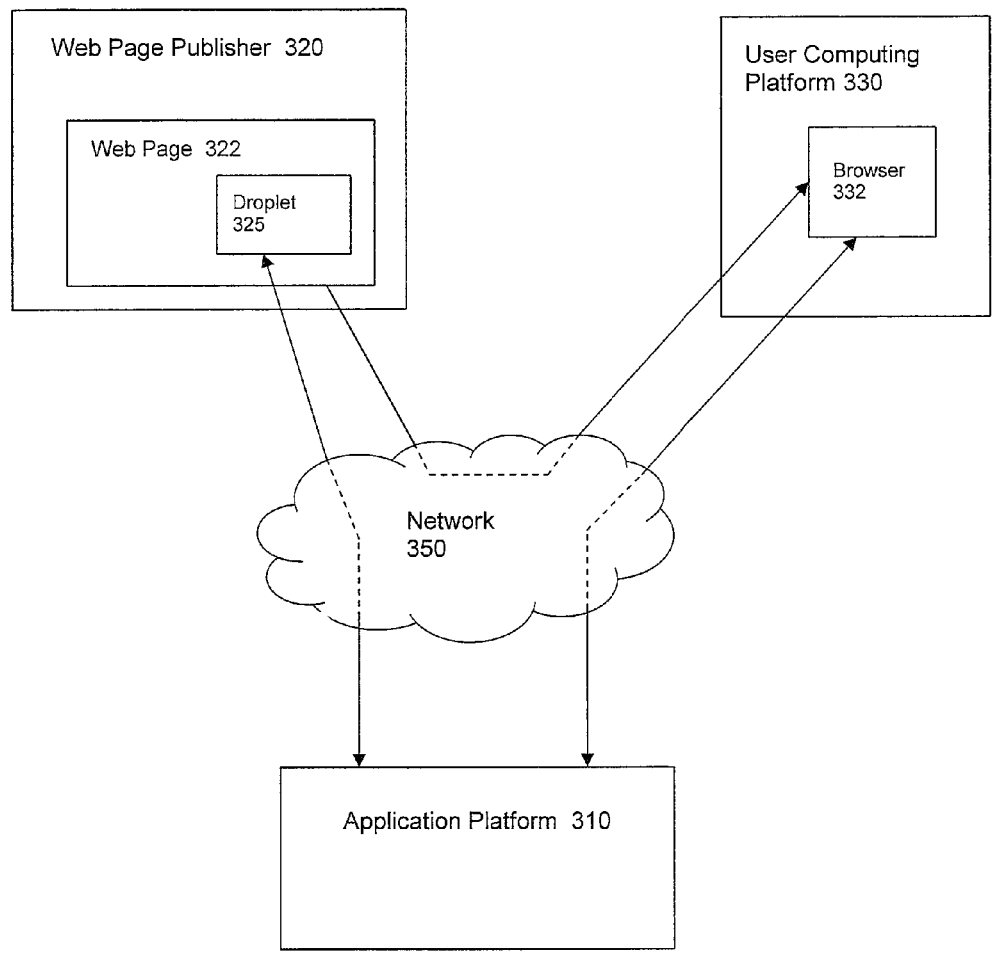
FIG. 3 is a block diagram of an example system comprising an application platform, a web page publisher, and a user computing platform.

FIG. 3 is a block diagram of an example system comprising an application platform 310, a web page publisher 320, and a user computing platform 330. In an example embodiment, an application execution environment may be divided among application platform 310, web page publisher 320, and user computing platform 330. For this example embodiment, a code segment may be provided to a web page publisher by an application platform. The code segment may be embedded in a web page generated by the web page publisher, and the user computing platform may execute the code segment at least in part in response to loading the web page. Further, for this example embodiment, a request for information related to one or more web applications may be received by the application platform from the user computing platform. The user computing platform may make the request at least in part in response to executing the code segment. The user computing platform may further provide contextual information related to the web page to the application platform. The application platform may provide information related to the one or more web applications to the user computing platform. The information related to the one or more web application may comprise information that is customized at least in part based on the provided contextual information related to the web site. In this manner, the web application may be customized in appearance and/or in operation based, at least in part, on the context of the web page.

In this example embodiment, application platform 310 may provide so-called "back-end" services such as data storage, application development, and/or page assembly, as well as provide social back-end database information, for just a few examples of services that may be provided. Thus, web site publisher 320 may be relieved of the burden of directly providing these services, and the cost and/or overhead of developing and/or maintaining the application execution environment may be reduced. For this example embodiment, web page publisher 320 may represent a third-party publisher, mentioned above. In other embodiments, web page publisher 320 may not be a third-party publisher, but may rather be part of the same entity as application platform 310. For example, a web site may publish web pages, and may also maintain an application platform in accordance with embodiments described herein. Thus, although FIG. 3 depicts web page publisher 320 and application platform 310 as separate entities, other embodiments are possible where web page publisher 320 and application platform 310 comprise a single entity.

Application platform 310, web page publisher 320, and user computing platform 330 for this example may be coupled to each other by way of a network 350. For this example embodiment, network 450 may comprise the Internet, although the scope of claimed subject matter is not limited in this respect. The web is an Internet service that organizes information through the use of hypermedia. HTML is typically used to specify the contents and format of a hypermedia document (e.g., a web page). XML may also be used to specify the contents and format of a web page. As used herein, a web site may refer to a collection of related web pages. The term "web page" as used herein may relate to any electronic document that may be accessed via a network such as the Internet. As alluded to above, in one or more embodiments, web pages for an example embodiment may comprise documents coded using one or more markup languages, such as, for example, HTML and/or XML, although the scope of claimed subject matter is not limited in this respect.

User computing platform 330 for this example embodiment may comprise a processor (not shown) that may execute instructions, including executing instructions related to a web browser 332. Web browser 332 for this example may comprise a conventional web browser to be executed by user computing platform 330 to allow a user to access and view web pages from across the Internet, including pages published by web page publisher 320. To view a page published by web page publisher 320, browser 332 may cause the page to be downloaded from web page publisher 320 to user computing platform 330, where the page may be displayed to the user. A web page may be identified by a Uniform Resource Identifier (URI) such as, for example, a Uniform Resource Locator (URL) associated with the web page.

For this example embodiment, web page publisher 320 may desire to implement an application execution environment on a web page. For example, web page publisher 320 may desire to provide a game application for use by one or more users across the Internet in the hopes that the game application may entice users to visit a web site. Application platform 310 may have stored thereon instructions implementing the desired application, and may further comprise a code segment associated with the desired application. Application platform 310 may transmit the code segment to web page publisher 320. For this example, the code segment may comprise instructions related to the application, which, for this example, may comprise the game application, although the scope of claimed subject matter is not limited in this respect. For an embodiment, the code segment may comprise Javascript instructions to implement the application. Javascript is a scripting language that may be embedded in an electronic document, such as, for example, an HTML based document. Although the example embodiments described herein utilize Javascript to implement applications, Javascript is merely an example of type of code that may be used to implement an application, and the scope of claimed subject matter is not limited in this respect. For example, for one or more additional embodiments, the code segment may comprise code implemented in PHP such as, for example, PHP release 5.2.6, although the scope of claimed subject matter is not limited in this respect. PHP is another example of a scripting language that may be embedded into an electronic document, such as an HTML document, for example, although the scope of claimed subject matter is not limited in this respect.

For one or more embodiments, the code segment may be embedded in one or more web pages by web page publisher 320. One such web page is labeled page 322 in FIG. 3. Web page 322 may include an area on the page on which an application may be run. The application area may be referred to as a "dropzone", mentioned above, in one or more embodiments, although the scope of claimed subject matter is not limited in this respect. Further, the code segment may be referred to as a "droplet", such as, for example, droplet 325 of FIG. 3, and may comprise instructions related to the application as well as instructions that may be utilized to implement the application execution area (dropzone) on web page 322. As used herein, for an embodiment, the term "code segment" is meant to include one or more instructions used to implement an application execution area in an electronic document, such as, for example a web page. Also, as used herein, for one or more embodiments, the terms "code segment" and "droplet" may be interchangeable, although the scope of claimed subject matter is not limited in this respect.

User computing platform 330 may, via browser 332, request the aforementioned web page 322 with the embedded droplet 325 from web page publisher 320. At least in part in response to receiving web page 322, browser 332 may execute the embedded code segment. The code segment may include instructions that may enable user computing platform 330 to communicate with application platform 310, for an example embodiment. For example, the execution of droplet 325 may direct user computing platform 330 to request information related to the application from application platform 310. User computing platform 330 may also provide one or more contextual elements related to web page 322 to application platform 310. Application platform 310 may, at least in part in response to receiving the provided contextual information and also at least in part in response to receiving the request for information, provide customized information to user computing platform 330, which may in turn utilize the information in the execution of the droplet. The customized information may be generated by application platform based, at least in part, on the provided contextual information. The customized information related to the application may comprise any of a wide range of information types, including, but not limited to, social backend information, user profile information, assembled pages, executable code, application configuration information, information related to the "look and feel" of the application, etc.

As described above, a droplet may be associated with one or more applications. For one embodiment, the droplet may direct user computing platform 330 to communicate with application platform 310 in order to implement the one or more web applications. Thus, web page publisher 320 may provide the one or more applications to user computing platform 330, but does not incur the overhead of providing application services, such as data storage/transfer and application execution, as these services are provided by application platform 310. For one or more embodiments, droplet 325 may comprise relatively few instructions, perhaps merely one or a few lines of code in some examples, and the bulk of the application processing responsibilities may be performed by application platform 310. In this manner, web page publisher 320 may distribute an application such as the application associated with droplet 325 with relative ease, due to the relatively small size of the droplet. Further, the small size of the droplet may allow an application developer to widely disseminate the application to a wide range of web page publishers, if desired. Web page publishers may be enticed to include the application in their web pages because of the relatively low overhead associated with embedding the code segment, and because the "heavy lifting" of the application execution and/or data transfer/storage associated with the application is handled by application platform 310.

As described above, a user may, for one or more embodiments, access a web application from more than one web page. Thus, application platform 310 may distribute droplet 325 to more than one web page publisher, or for another embodiment web page publisher 320 may include droplet 325 in more than one web page. Browser 332 may access the web application associated with droplet 325 from any of the web pages embedding droplet 325, provided that the user has sufficient permissions to access the web application. Application platform 310 may maintain a user profile for the user that may include an application bin for the user, as described above. Thus, application platform 310 may maintain permissions for various applications for the user. For an embodiment, web page publisher 320 may publish a landing page for the application, and/or may publish a personalized start-up page for the user. For one embodiment, a user profile page may be published and/or maintained by application platform 310. Of course, these are merely examples of how user information and/or permissions may be managed, and the scope of claimed subject matter is not limited in this respect.

For one or more embodiments, the application associated with droplet 325 may be largely executed by application platform 310, with relatively little processing performed by user computing platform 330. For one example embodiment, application platform 310 may receive keystroke and/or pointing device information from user computing platform 330, and in response may assemble appropriate pages of javascript code to be executed by browser 332. Compute-intensive operations may be performed by application platform 310, thereby relieving user computing platform 330 of much of the burden of executing the application, for an example embodiment. Browser 332 for this example may receive the assembled pages of javascript code and may run the code using a javascript interpreter coupled with browser 332. The application may be displayed by browser 332 in the web page's dropzone. Thus, the overhead incurred by user computing platform 330 in executing the application is relatively small. Further, because web page publisher 320 is not involved in the transfer of the assembled javascript pages, web page publisher 320 may not incur a load other than initially delivering web page 322 including droplet 325 to user computing platform 330.

For one or more other embodiments, user computing platform 330 may be more involved in the execution of the application than was the case in the previous example embodiments. The droplet and its associated application may be architected in a manner to allocate execution responsibilities in anyway that may be advantageous.

Figure 4:
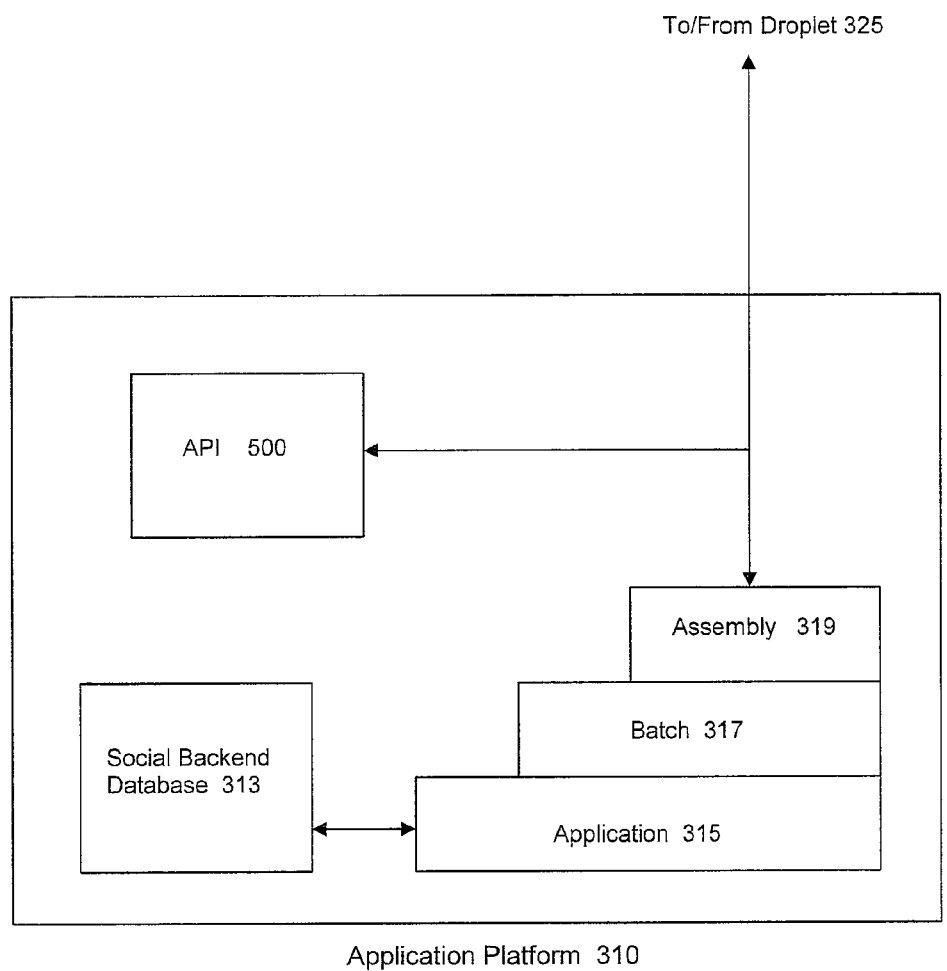
FIG. 4 is a block diagram of an example embodiment of an application platform.

FIG. 4 is a block diagram of an example embodiment of application platform 310, shown in more detail. Application platform 310 may comprise a computing platform including one or more processors (not shown). Application platform 310 may comprise a social backend database 313 that may store social information that may be used in connection with one or more applications. Social information may comprise any of a wide range of information types. Some examples of social information may include, but are not limited to, user profile information, friends lists for a number of users, game scores and/or progress information, lists of visited web sites, information regarding user browsing behaviors, information regarding user's interests, etc. Of course, these are merely examples of social information, and the scope of claimed subject matter is not limited in this regard.

Application platform 310 may execute instructions that may implement an API 500, as well as a software stack comprising an application layer 315, a batch layer 317, and an assembly layer 319. Application layer 315 may comprise instructions that, if executed, direct application platform 310 to generate one or more applications. Further, web applications may be customized and/or modified depending at least in part on contextual information for one or more web pages, as previously described. Any of a wide range of application types may be implemented. Examples of application types that may be implemented may include, but are not limited to, fantasy sports games, word processors, spreadsheet calculators, card games, board games, financial applications, musical composition and notation, educational applications, language study applications, etc., to name but a few. Of course, these are merely examples of application types, and the scope of claimed subject matter is not limited in these respects.

Batch layer 317 may comprise instructions that, if executed, may batch together one or more applications provided by application layer 315. Assembly layer 319 may comprise instructions that, if executed, direct application platform 310 to assemble one or more pages of code according to the batched one or more applications for delivery to user computing platform 330. For this example, the pages of code may comprise javascript code, although the scope of claimed subject matter is not limited in this respect.

Further for this example embodiment, web page publisher 320 may communicate with application platform 310 by way of API 500, described in more detail below. Communications may take place through droplet 325, for this example embodiment. That is, droplet 325 may include code that if executed may provide programming hooks for web publisher 320 in order for web publisher 320 to make a variety of requests of application platform 310. Droplet 325 may further include hooks for web publisher 320 to provide contextual information for web page 322, for an example embodiment.

Figure 5:
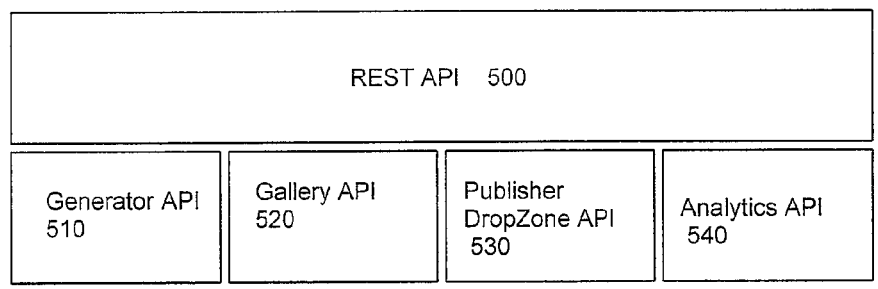
FIG. 5 is a block diagram depicting application programming interfaces related to a web application platform.

FIG. 5 is a diagram illustrating an example embodiment of API 500. For one or more embodiments, the APIs described herein may comprise "restful" APIs. A "restful" API may refer to any relatively simple interface which may transmit domain-specific data over hypertext transfer protocol (HTTP) without an additional messaging layer, for one example embodiment. Restful APIs may be characterized, at least in part, by their simplicity. Of course, a restful API is merely an example, and the scope of claimed subject matter is not limited in this respect. For this example embodiment, API 500 may comprise several sub-APIs. For example, API 500 may comprise a generator API 510, a gallery API 520, a publisher dropzone API 530, and an analytics API 540. In an embodiment, generator API 510 may comprise an API through which web publisher 320 may request one or more applications to be included in its dropzone. In an embodiment, web page publisher 320 may provide contextual information related to web page 322 through the generator API, although the scope of claimed subject matter is not limited in this respect. Gallery API 520 for an embodiment may comprise a read-only API through which web publisher 520 may receive information regarding which applications are to be included in the dropzone for a particular web site. Also, publisher dropzone API 530 for this example may comprise an API through which web publisher 320 may specify various aspects of its dropzone including, but not limited to, specific applications to be included in the dropzone as well as customization parameters. The customization parameters for this example may comprise parameters that specify the "look and feel" of a web page's dropzone. The look and feel aspects of a dropzone may include a presentation layer that may comprise a skin as well as a menu system, which, for an embodiment may be referred to as a "chrome" architecture, described above. The customization parameters may further comprise contextual elements for web page 322 upon which web application customization may be based, at least in part, for an example embodiment. API 500 may also comprise an analytics API 540 through which web page publisher 320 may request various statistics regarding a dropzone. For example, web page publisher 320 may request information related to the performance of one or more applications, as well as information regarding which is the more popular application among a number of applications, to name just a couple of examples. Of course, other types of information may be made available through the analytics API in one or more embodiments.

It should be noted that for one or more embodiments, web publisher 320 may access API 500 through droplet 325, and that for one or more embodiments there may be no other paths through which web publisher 320 may access API 500. For one or more embodiments where web publisher 320 comprises the same entity as application platform 310, other paths of communication may be provided between the web publisher and the application platform. Further, for one or more embodiments, API 500 may comprise a programming interface through which a web application developer may specify a web application that may be represented in multiple views across multiple endpoints, as described previously.

Figure 6:
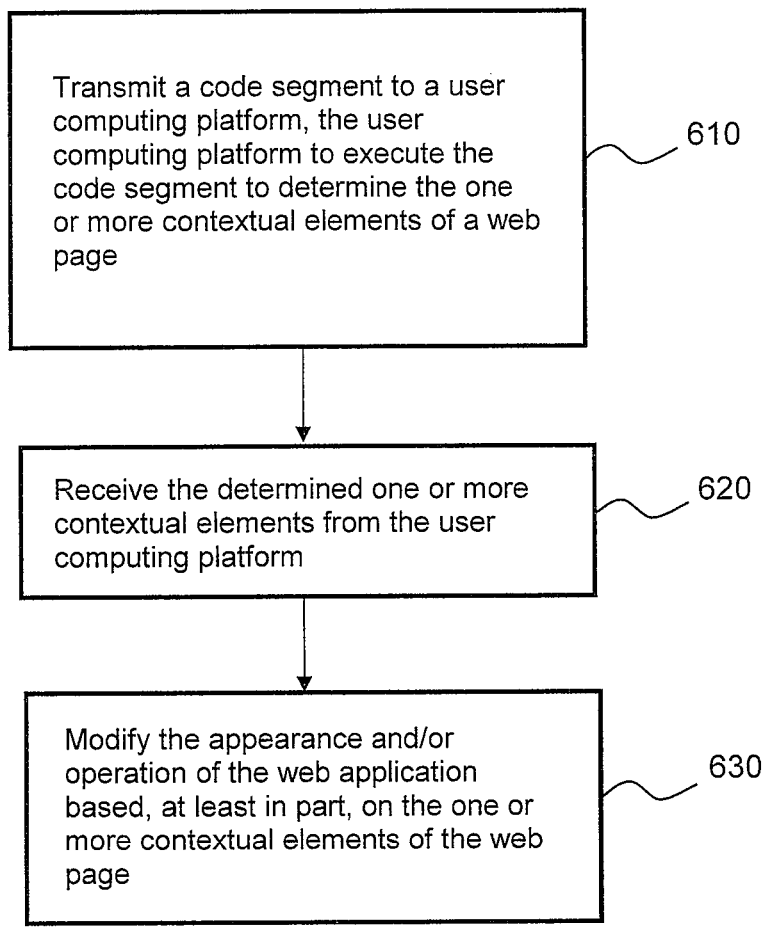
FIG. 6 is a flow diagram of an example embodiment of a method for supporting modifying the appearance and/or operation of a web application based at least in part on web page context.

FIG. 6 is a flow diagram of an example embodiment of a method for customizing a web application based, at least in part, on one or more contextual elements of the web page. At block 610, a code segment may be transmitted to a user computing platform. The user computing platform may execute the code segment to determine one or more contextual elements of the web page. As previously describe, in an embodiment the contextual elements may be provided by the user computing platform performing a syntactic analysis of the web page.

In another embodiment, a web page publisher may provide the one or more contextual elements to the application platform. However, these are merely examples of how contextual information for a web page may be determined, and the scope of claimed subject matter is not limited in this respect. At block 620, the determined one or more contextual elements may be received from the user computing platform, and at block 630, the appearance and/or operation of the web application may be modified based, at least in part, on the one or more contextual elements of the web page.

Information may be assembled, wherein the information may be related to one of a plurality of views of the web application to be rendered at a user computing platform and to be displayed by the user computing platform in a plurality of application areas for a respective plurality of web pages associated with the user. Also, the application area may comprise a dropzone, as described herein, and the web application may be modified according to a context of the web page, discussed above. However, these are merely examples of web pages that may be associated with a user and of application areas for those web pages, and the scope of claimed subject matter is not limited in these respects. Embodiments in accordance with claimed subject matter may include more than, less than, or all of blocks 610-630. Also, the order of blocks 610-630 is merely an example order, and the scope of claimed subject matter is not limited in this respect.

Figure 7:
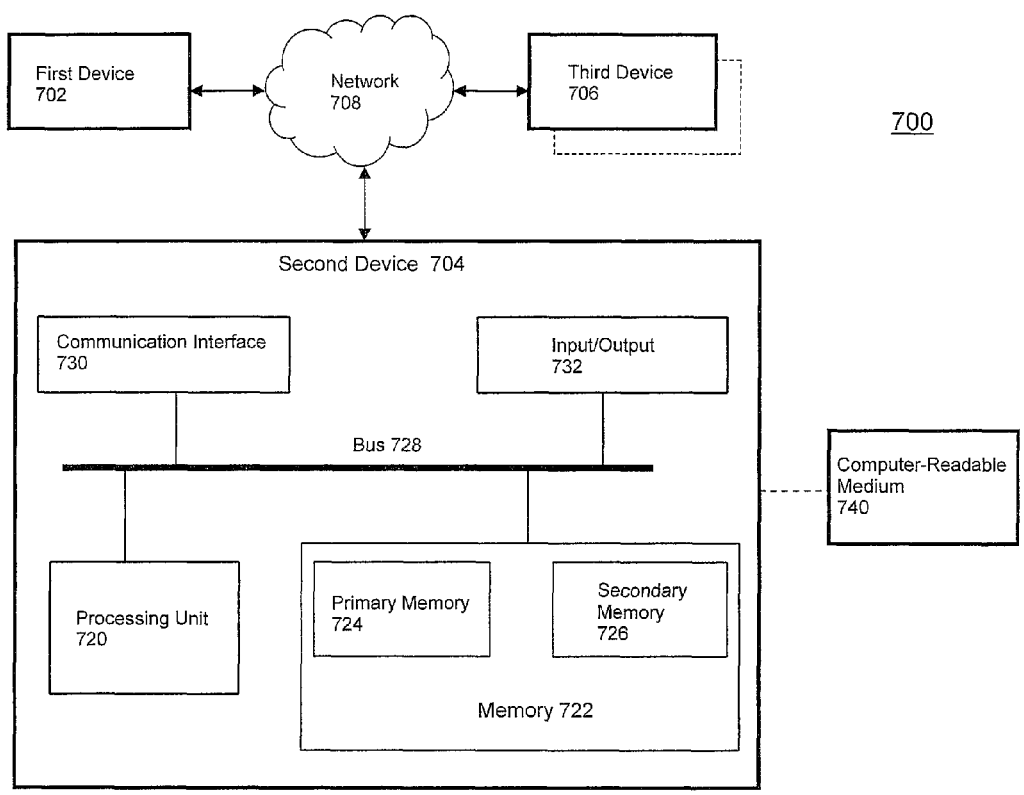
FIG. 7 is a block diagram illustrating an example system comprising a plurality of computing devices coupled via a network in accordance with one or more embodiments.

FIG. 7 is a schematic diagram illustrating an exemplary embodiment of a computing environment system 700 that may include one or more devices configurable to implement techniques and/or processes described above in connection with dropzones and/or droplets and/or web applications discussed above in connection with FIGS. 1-6, for example. System 700 may include, for example, a first device 702, a second device 704, and a third device 706, which may be operatively coupled together through a network 708.

First device 702, second device 704 and third device 706, as shown in FIG. 7, may be representative of any device, appliance or machine that may be configurable to exchange data over network 708. By way of example but not limitation, any of first device 702, second device 704, or third device 706 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 708, as shown in FIG. 7, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to network 708.

It is recognized that all or part of the various devices and networks shown in system 700, and the processes and methods as further described herein, may be implemented using or otherwise include hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that if executed by a computing platform, such as a computer, a computing system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

Unless specifically stated otherwise, as apparent from the discussion herein, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   obtaining one or more contextual elements of a web page at an application server from a user computing device,
      wherein the web page comprises an embedded code segment and the web page is communicated to the user computing device from a web page publisher computing device,
      wherein the one or more contextual elements of the web page comprise one or more web page characteristics determined by the user computing device at least in part by executing the code segment, the one or more web page characteristics being determined at least in part on an analysis of the web page by the user computing device; and
   automatically customizing an appearance and an operation of a web application at the application server based, at least in part, on the one or more contextual elements of the web page,
      wherein the automatically customizing the appearance and/or operation of the web application comprises assembling one or more web application pages comprising customized social content and communicating one or more signals comprising the one or more assembled web application pages from the application server to the user computing device,
      the customized social content being selected by the application server from a social backend database based at least in part on the one or more contextual elements of the web page.

2. The method of claim 1, comprising:
   communicating the code segment from the application server to the user computing device by way of the web page publisher computing device.

3. The method of claim 1, the web application being displayed in an application area on the web page at the user computing device.

4. The method of claim 1, further comprising:
   assembling a personalized start-up page related to the web application at the application server according to the automatically customized appearance and/or operation of the web application; and
   communicating one or more signals comprising the personalized start-up page related to the web application from the application server to the user computing device.

5. The method of claim 1, wherein the web page publisher computing device and the application server are separate entities.

6. The method of claim 1, wherein the analysis of the web page comprises a syntactic analysis of a uniform resource identifier associated with the web page.

7. The method of claim 1, wherein the analysis of the web page comprises an analysis of one or more text elements for the web page to identify one or more frequently used text strings, wherein the one or more contextual elements comprises the one or more frequently used text strings.

8. The method of claim 1, wherein the obtaining the one or more contextual elements comprises obtaining one or more tag values provided with the web page to the user computing device by the web page publisher computing device.

9. The method of claim 8, wherein the one or more tag values comprise one or more of a domain name, a category value, a class value, and/or an entity identifier, and/or any combination thereof.

10. An article, comprising: a non-transitory storage medium having stored thereon instructions executable by an application server computing device to:
    automatically customize an appearance and operation of a web application based, at least in part, on one or more contextual elements of a web page to be communicated from a user computing device,
    wherein the web page comprises an embedded code segment and the web page is to be communicated to the user computing device from a web page publisher computing device,
    wherein the one or more contextual elements of the web page to comprise one or more characteristics of the web page to be determined by the user computing device at least in part by execution of the code segment,
    the one or more web page characteristics to be determined at least in part on a analysis of the web page by the user computing device, the application server computing device to assemble one or more web application pages to include customized social content and to communicate one or more signals to comprise the one or more assembled web application pages to the user computing device,
    the customized social content to be selected from a social backend database based at least in part on the one or more contextual elements of the web page.

11. The article of claim 10, wherein the storage medium has stored thereon further instructions executable by the application server computing device to:
    communicate the code segment from the application server computing device to the user computing device by way of the web page publisher computing device.

12. The article of claim 10, the web application to be displayed in an application area on the web page at the user computing device.

13. The article of claim 10, wherein the storage medium has stored thereon further instructions executable by the application server computing device to:
    assemble a personalized start-up page to be related to the web application in accordance with the automatically customized appearance and/or operation of the web application; and
    communicate one or more signals to comprise the personalized start-up page to be related to the web application to the user computing device.

14. The article of claim 10, wherein the web page publisher computing device and the application server computing device are separate entities.

15. The article of claim 10, wherein the analysis of the web page to comprise a syntactic analysis of a uniform resource identifier associated with the web page.

16. The article of claim 10, wherein the analysis of the web page to comprise an analysis of one or more text elements for the web page to identify one or more frequently used text strings, wherein the one or more contextual elements to comprise the one or more frequently used text strings.

17. The article of claim 10, wherein the one or more contextual elements of the web page to comprise one or more tag values to be provided with the web page to the user computing device by the web page publisher computing device.

18. The article of claim 17, wherein the one or more tag values to comprise one or more of a domain name, a category value, a class value, and/or an entity identifier, and/or any combination thereof.

19. An apparatus, comprising:
    means for obtaining one or more contextual elements of a web page at an application server computing device from a user computing device,
        wherein the web page comprises an embedded code segment and the web page is to be communicated to the user computing device from a web page publisher computing device,
        wherein the one or more contextual elements of the web page are to comprise one or more web page characteristics to be determined by the user computing device at least in part by execution of the code segment, the one or more web page characteristics to be determined by the user computing device at least in part on an analysis of the web page; and
    means for automatically customizing an appearance and operation of a web application at the application server computing device to be based, at least in part, on the one or more contextual elements of the web page,
    wherein the means for automatically customizing the appearance and/or operation of the web application is to comprise means for assembling one or more web application pages comprising customized social content and to communicate one or more signals to comprise the one or more assembled web application pages from the application server computing device to the user computing device,
    the customized social content to be selected from a social backend database to be based at least in part on the one or more contextual elements of the web page.

20. The apparatus of claim 19, comprising:
    means for communicating the code segment from the application server computing device to the user computing device by way of the web page publisher computing device.

21. The apparatus of claim 19, the web application to be displayed in an application area on the web page at the user computing device.

22. The apparatus of claim 19, further comprising:
    means for assembling a personalized start-up page related to the web application at the application server computing device according to the automatically customized appearance and/or operation of the web application; and
    means for communicating one or more signals comprising the personalized start-up page related to the web application from the application server computing device to the user computing device.

23. The apparatus of claim 19, wherein the application server computing device and the web page publisher computing device are separate entities.

24. The apparatus of claim 19, wherein the analysis of the web page comprises a syntactic analysis of a uniform resource identifier associated with the web page.

25. The apparatus of claim 19, wherein the analysis of the web page comprises an analysis of one or more text elements for the web page to identify one or more frequently used text strings, wherein the one or more contextual elements comprises the one or more frequently used text strings.

26. The apparatus of claim 19, wherein the means for obtaining the one or more contextual elements of the web page comprises means for obtaining one or more tag values provided with the web page to the user computing device by the web page publisher computing device.

27. The apparatus of claim 26, wherein the one or more tag values comprise one or more of a domain name, a category value, a class value, and/or an entity identifier, and/or any combination thereof.

* * * * *